March 15, 1955     S. A. TELL     2,703,980
DYNAMOMETER
Filed Aug. 5, 1953
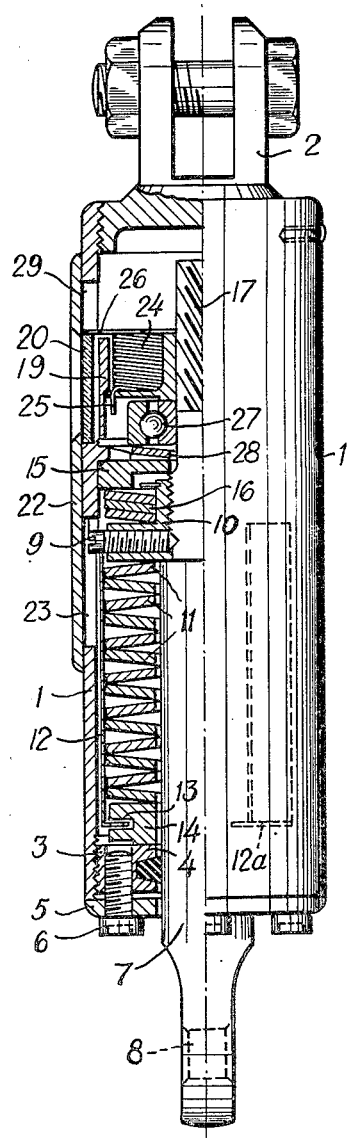
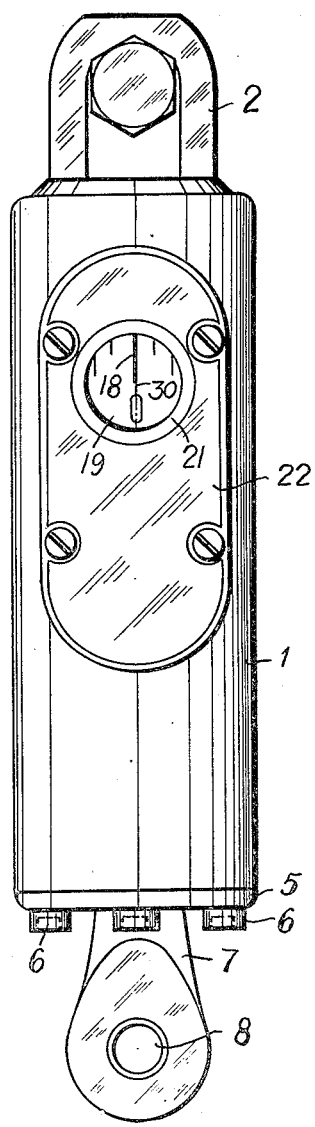
INVENTOR.
BY

United States Patent Office 2,703,980
Patented Mar. 15, 1955

2,703,980
DYNAMOMETER

Sven Axel Tell, Johanneshov, Sweden, assignor to Aktiebolaget Piab, Stockholm, Sweden, a corporation of Sweden Application August 5, 1953, Serial No. 372,528

5 Claims. (Cl. 73—141)

The present invention relates to a dynamometer having a draw-rod which can be longitudinally displaced in a casing against the action of a spring, the force to be measured to be applied to the casing and to the draw-rod the displacement of which relatively to the casing can be read off from a graduated scale. According to the invention between a stop on the draw-rod and a preferably adjustable bottom in the casing there are arranged spring elements in the form of annular, conical disc springs which surround the draw-rod.

By the employment of disc springs the dynamometer can be conveniently adapted for measuring large or small forces by the insertion of a greater or smaller number of disc springs. Moreover, the spring elements occupy very little space relatively to the force to be measured by the apparatus. The use of disc springs makes very exacting demands on the precision of the members by means of which the said scale reading of the force can be effected, and one object of the invention is, therefore, to provide a special arrangement of these members. Other objects of the invention will appear from the following description and accompanying drawing which illustrates the invention by way of example. In the drawing:

Fig. 1 shows the dynamometer in partial longitudinal section according to one form of construction. Fig. 2 is an external view of the same and at an angle of 90° in relation to Fig. 1.

1 denotes the cylindrical casing of the apparatus to one end of which a fixing yoke 2 or the like is secured. At the other end a bottom ring 4 is screwed into a thread 3 formed internally of the casing, and said ring is covered in turn by a bottom plate 5 through which pass a number of fixing screws 6 threaded into the bottom ring 3.

The draw-rod which is shown at 7 is provided with a hole 8 for a fixing bolt. The dynamometer is secured by fixing devices 2 and 7, 8 between two parts, for example, between a rigidly fixed part and a line-tensioning device or the like for measuring the tension in a line or wire which has to be stretched.

A screw-threaded stop-ring 10 is fixed on the draw-bolt by means of a set screw 9 and a series of annular, conical disc springs 11 are placed around the draw-bolt and held against the said stop-ring, the disc springs being preferably arranged in pairs with concave sides of both springs of each pair mutually facing each other.

The centre hole in the springs is somewhat larger than the diameter of the draw-bolt so that the movement of the draw-rod relatively to the springs is not checked. To ensure accurate centering of the springs the latter are guided at their peripheries by at least three thin flat bars 12, one of which 12a is indicated by broken lines in the part of Fig. 1 which is not in section. These bars, thus indicated as in the present instance spaced 120° apart, are fixed at a bottom bent-over portion, one of said portions being shown at 13, to a ring 14 which rests on the bottom ring 4 and against which the spring discs 11 are supported. The flat, resilient bars 12 lie with their longitudinal edges against the inner wall of the cylinder 1 whereby their longitudinally central portions, against which the disc springs lie at their peripheries, will have a certain resilient movement outwards when the peripheral diameter of the disc springs is increased under compression.

An annular intermediate lateral wall 15 is fixed in the casing 1. Between the former and the stop-ring 10 a spring is inserted, such as a number of disc springs 16 for example, which serves as a resilient protective stop in the event of the line attached to the dynamometer jumping off or when the load decreases rapidly in some other manner so that the disc springs 11 force the draw-bolt into the casing.

The inner end 17 of the draw-rod 7 is provided with a flat screw-thread having a long pitch and on this thread the hub for a drum 19 is mounted which drum is provided with a scale 18 (Fig. 2) visible through a window 20 provided with scale divisions 30 for readings and an opening 21 in a plate 22 arranged on the cylinder 1. This plate also covers a longitudinal slot 23 in the cylinder wall in which slot the head of the set screw 9 is guided. It likewise covers a further longitudinal slot 29.

In the drum 19 a long torsion spring 24 is mounted one end 25 of which is attached to the drum, its other end 26 entering the slot 29. The spring tends to rotate the drum inwards on the thread 17. The drum is supported against one ring of a ball bearing 27 loosely threaded on the draw-rod, the other being supported against the intermediate annular lateral wall 15, preferably through the interposition of a disc spring 28. One purpose of the disc spring 28 amongst others is to produce a resilient reduction of the stresses on the thread 17 when the dynamometer is subjected to a change of load with a jerk.

When the draw-bolt is under tension relatively to the casing it is displaced in an outward direction under the compression of the disc springs 11. At the same time the scale drum 19 is rotated against the action of the spring 24 on the threads of the part 17. The scale 18 which shows against the scale divisions 30 the tensile force corresponding to the various degrees of compression is exactly determined by empirical methods. The fine adjustment of the zero position can be carried out by loosening the bottom screws 6 and turning the bottom ring 4 on its thread 3, whereafter the screws 6 are tightened again.

The axial displacement of the bottom ring 4 is accompanied by a corresponding slight axial displacement of the draw-rod and therefore also by the rotation of the scale drum 19 which in the position of rest (zero position) is always held pressed against one ring of the ball bearing 27 or some other suitable stop.

If the load ceases suddenly while the apparatus is in use, the shock on the draw-rod produced by the springs 11 is absorbed by the above-mentioned resilient protective stop 16. At the same time, however, the scale drum 19 is forced back with the draw-rod since the spring 24 is unable to counteract this shock. The end of the spring 26 then slides upwards in the slot 29. After the shock has ceased the spring 24 rotates the scale drum so that the latter is screwed down on the part 17 of the draw-rod until it lies up against the ball bearing 27. This arrangement of the scale drum can also be applied with other types of compression springs than disc springs but is of special importance for this type in particular as the arrangement will then work as a whole with the greatest precision.

The form of construction for the dynamometer illustrated, which can also be used as a weighing scale, may be varied in different ways without departure from the scope of the invention as defined in the appended claims.

What I claim is:

1. A dynamometer comprising a casing and a draw-rod longitudinally displaceable in the casing against the action of spring elements, the force to be measured to be applied to the casing and to the draw-rod, a graduated scale to read off the displacement of the draw-rod relatively to the casing, said spring elements having the form of annular conical disc springs surrounding the draw-rod and being arranged between a stop member fixed on the draw-rod and one bottom of the casing, the draw-rod passing through said bottom, the disc springs being supported against the said bottom of the casing by means of a ring loosely pushed onto the draw-rod, thin bars arranged at the periphery of the said ring and extending in the longitudinal direction of the cylindrical casing with their longitudinal edges lying against the inside of the casing and with their longitudinally central portions touching the said disc springs at their peripheries for the purpose of centering the disc rings.

2. A dynamometer comprising a casing and a draw-rod longitudinally displaceable in the casing against the action of spring elements, the force to be measured to be applied to the casing and to the draw-rod, said spring elements having the form of annular conical disc springs surrounding the draw-rod and being arranged between a stop member fixed on the draw-rod and one bottom of the casing, an intermediate lateral ring-wall in the casing, the draw-rod passing through said bottom and ring-wall, said disc springs acting on the draw-rod being located in the space between said intermediate ring-wall and said bottom of the casing, a measuring member provided with a measuring scale to read off the displacement of the draw-rod relatively to the casing being provided on the side of the intermediate ring-wall opposite the said disc springs and engaging with the draw-rod by means of screw-threads having a long pitch so that the measuring member will be rotated when the draw-rod is axially displaced in the casing, the said intermediate ring-wall being fixed to the casing, and the said bottom of the casing comprising a bottom ring screwed into a thread in one end of the casing and a bottom plate through which the draw-rod passes covering the said end of the casing, a number of fixing screws passing through said bottom plate and being threaded into the bottom ring.

3. A dynamometer comprising a casing and a draw-rod longitudinally displaceable in the casing against the action of spring elements, the force to be measured to be applied to the casing and to the draw-rod, said spring elements having the form of annular conical disc springs surrounding the draw-rod and being arranged between a stop member fixed on the draw-rod and one bottom of the casing, an intermediate lateral ring-wall in the casing, the draw-rod passing through said bottom and ring-wall, said disc springs acting on the draw-rod being located in the space between said intermediate ring-wall and said bottom of the casing, a measuring member provided with a measuring scale to read off the displacement of the draw-rod relatively to the casing being provided on the side of the intermediate ring-wall opposite the said disc springs and engaging with the draw-rod by means of screw-threads having a long pitch so that the measuring member will be rotated when the draw-rod is axially displaced in the casing, said measuring member being connected to one end of a torsion spring the other end of which is guided for movement substantially axially of the draw-rod.

4. A dynamometer comprising a casing and a draw-rod longitudinally displaceable in the casing against the action of spring elements, the force to be measured to be applied to the casing and to the draw-rod, said spring elements having the form of annular conical disc springs surrounding the draw-rod and being arranged between a stop member fixed on the draw-rod and one bottom of the casing, an intermediate lateral ring-wall in the casing, the draw-rod passing through said bottom and ring-wall, said disc springs acting on the draw-rod being located in the space between said intermediate ring-wall and said bottom of the casing, a measuring member provided with a measuring scale to read off the displacement of the draw-rod relatively to the casing being provided on the side of the intermediate ring-wall opposite the said disc springs and engaging with the draw-rod by means of screw-threads having a long pitch so that the measuring member will be rotated when the draw-rod is axially displaced in the casing, said measuring member being supported in the zero position of the scale against the radially inner ring of a radial ball bearing loosely surrounding the draw-rod, the radially outer ring of the ball bearing being supported through the interposition of a spring member against the said intermediate lateral ring-wall of the casing.

5. A dynamometer comprising a casing and a draw-rod longitudinally displaceable in the casing against the action of spring elements, the force to be measured to be applied to the casing and to the draw-rod, said spring elements having the form of annular conical disc springs surrounding the draw-rod and being arranged between a stop member fixed on the draw-rod and one bottom of the casing, an intermediate lateral ring-wall in the casing, the draw-rod passing through said bottom and ring-wall, said disc springs acting on the draw-rod being located in the space between said intermediate ring-wall and said bottom of the casing, a measuring member provided with a measuring scale to read off the displacement of the draw-rod relatively to the casing being provided on the side of the intermediate ring-wall opposite the said disc springs and engaging with the draw-rod by means of screw-threads having a long pitch so that the measuring member will be rotated when the draw-rod is axially displaced in the casing, and there is a resilient protective stop arranged between the stop member fixed on the draw-rod and the intermediate lateral ring-wall of the casing.

References Cited in the file of this patent

UNITED STATES PATENTS

| Number | Name | Date |
|---|---|---|
| 1,895,863 | Pollak | Jan. 31, 1933 |
| 2,512,187 | Von Cseh | June 20, 1950 |
| 2,559,800 | Ryan | July 10, 1951 |

FOREIGN PATENTS

| Number | Country | Date |
|---|---|---|
| 827,850 | France | Feb. 2, 1938 |